(12) United States Patent
Wyrsta

(10) Patent No.: US 11,427,487 B2
(45) Date of Patent: Aug. 30, 2022

(54) COMPOSITIONS AND METHODS FOR TREATMENT OF MINE TAILINGS

(71) Applicant: Lixivia, Inc., Santa Barbara, CA (US)

(72) Inventor: Michael D. Wyrsta, Santa Barbara, CA (US)

(73) Assignee: Lixivia, Inc., Santa Barbara, CA (US)

( * ) Notice: Subject to any disclaimer, the term of this patent is extended or adjusted under 35 U.S.C. 154(b) by 0 days.

(21) Appl. No.: 17/051,029

(22) PCT Filed: May 9, 2019

(86) PCT No.: PCT/US2019/031523
§ 371 (c)(1),
(2) Date: Oct. 27, 2020

(87) PCT Pub. No.: WO2019/217683
PCT Pub. Date: Nov. 14, 2019

(65) Prior Publication Data
US 2021/0053851 A1    Feb. 25, 2021

Related U.S. Application Data

(60) Provisional application No. 62/669,866, filed on May 10, 2018.

(51) Int. Cl.
*C02F 1/66* (2006.01)
*C02F 1/62* (2006.01)
(Continued)

(52) U.S. Cl.
CPC .............. *C02F 1/62* (2013.01); *B09B 3/80* (2022.01); *C02F 1/66* (2013.01); *C04B 5/06* (2013.01);
(Continued)

(58) Field of Classification Search
USPC .................................................. 210/688, 749
See application file for complete search history.

(56) References Cited

U.S. PATENT DOCUMENTS 4,201,667 A * 5/1980 Liao ...................... C02F 1/5236
                                                     210/721
4,446,006 A * 5/1984 Albertson .............. C10G 29/02
                                                     208/251 R
(Continued)

FOREIGN PATENT DOCUMENTS

JP    2005074280    3/2005
JP    2013031837    2/2013
(Continued)

OTHER PUBLICATIONS

"Removal of Arsenic form Synthetic Acid Mine Drainage by Electrochemical pH Adjustment and Co-precipitation of Iron Hydroxide", Jenny Weijun Wang et al., Environ. Sci. Technology 2003, 37, 4500-4506 (Year: 2003).*

(Continued)

*Primary Examiner* — Nina Bhat
(74) *Attorney, Agent, or Firm* — Fish IP Law, LLP

(57) ABSTRACT

Compositions and methods for treating waste water produced by copper mining operations are described herein. Slag from steel making operations and other industrial waste materials that include alkali metal and/or alkaline earth elements have been found to both raise pH of the waste water and also reduce arsenic content. Following such treatment the spent slag or industrial waste can be utilized as a source of valuable metals or incorporated into stabilized building materials.

7 Claims, 2 Drawing Sheets

(51) Int. Cl.
*C04B 5/06* (2006.01)
*C22B 7/00* (2006.01)
*B09B 3/80* (2022.01)
*C02F 101/10* (2006.01)
*C02F 101/20* (2006.01)
*C02F 103/10* (2006.01)

(52) U.S. Cl.
CPC ........ *C22B 7/006* (2013.01); *C02F 2101/103* (2013.01); *C02F 2101/20* (2013.01); *C02F 2103/10* (2013.01)

(56) References Cited

U.S. PATENT DOCUMENTS

| | | | | |
|---|---|---|---|---|
| 4,489,046 | A * | 12/1984 | Petersson | C22B 30/04 |
| | | | | 588/314 |
| 4,857,203 | A * | 8/1989 | Pope | B01J 20/103 |
| | | | | 210/681 |
| 5,603,838 | A * | 2/1997 | Misra | C02F 1/281 |
| | | | | 210/665 |
| 7,247,242 | B1 * | 7/2007 | Moore | C02F 1/281 |
| | | | | 210/662 |
| 7,897,052 | B2 * | 3/2011 | Reddy | B01J 20/0237 |
| | | | | 210/681 |
| 2001/0054588 | A1 * | 12/2001 | Smith | B09C 1/002 |
| | | | | 210/662 |
| 2003/0155303 | A1 * | 8/2003 | Harck | B01J 20/0207 |
| | | | | 210/683 |
| 2004/0007536 | A1 * | 1/2004 | Videla | B01D 1/26 |
| | | | | 210/737 |
| 2005/0150835 | A1 * | 7/2005 | Vo | B01J 20/186 |
| | | | | 210/660 |
| 2009/0022639 | A1 * | 1/2009 | Poijarvi | C22B 30/04 |
| | | | | 423/24 |
| 2011/0094942 | A1 * | 4/2011 | Ochi | C22B 15/0008 |
| | | | | 209/12.1 |
| 2012/0138530 | A1 * | 6/2012 | Burba, III | B01D 15/00 |
| | | | | 210/638 |
| 2012/0193295 | A1 | 8/2012 | Bhaduri | |
| 2013/0004389 | A1 * | 1/2013 | Okamoto | C22B 15/0008 |
| | | | | 423/26 |
| 2014/0190898 | A1 * | 7/2014 | Alcantar | C02F 1/5245 |
| | | | | 210/726 |
| 2017/0088439 | A1 * | 3/2017 | Thakur | A23L 2/80 |
| 2017/0144911 | A1 * | 5/2017 | Lakshmanan | C02F 9/00 |
| 2019/0047885 | A1 * | 2/2019 | Nelson | C02F 1/444 |

FOREIGN PATENT DOCUMENTS

| | | |
|---|---|---|
| JP | 2013116465 | 6/2013 |
| KR | 1013442236 | 1/2014 |

OTHER PUBLICATIONS

"Arsenic removal using steel manufacturing by products as permeable reactive materials in mine tailing containment systems", Jon Sung Ahn et al., Water Research 37 (2003) 2478-2488 (Year: 2003).*

"Removal of Arsenic (III) from Groundwater using Low-Cost Industrial By-products-Blast Furnace Slag", Kanel et al., Water Qual. Res.J. Canada, 2006, vol. 41, No. 2, 130-139 (Year: 2006).*

"Arsenic Removal from Water Using Industrial By-Products", Branislava M. Lekic et al., Hindawi Publishing Corp., Journal of Chemistry, vol. 2013, Article ID 121024, 9 Pages. (Year: 2013).*

International Search Report dated Aug. 22, 2019, for PCT Application Serial No. PCT/US19/31523, filed on May 9, 2019. 11 pages.

* cited by examiner

COMPOSITIONS AND METHODS FOR TREATMENT OF MINE TAILINGS

This application claims the benefit of U.S. Provisional Application No. 62/669,866 filed on May 10, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is treatment of mine tailings, particularly copper mine tailings.

BACKGROUND

The following description includes information that may be useful in understanding the present invention. It is not an admission that any of the information provided herein is prior art or relevant to the presently claimed invention, or that any publication specifically or implicitly referenced is prior art.

In the production of copper from ore copper ore (generally an oxide or sulfide, typically a sulfide) is mined and subjected to a series of physical and chemical processes that serve to release copper from the waste (gangue) materials and concentrate it. Typically copper ore contains only a small percentage of the metal (averaging less than 0.6%), with economically viable copper ore making up less than 2% of the total volume or ore recovered by mining. Typically the copper-containing ore is crushed, and then ground into a fine powder. This powder, which is sized to provide particles that consist of individual mineral phases, is added to water along with flotation chemicals (such as xanthates, dithiophosphates, dithiocarbamates, etc.). These flotation chemicals render the sulfide-rich particles that contain copper hydrophobic, causing them associate with surfactants to form a froth when air is bubbled through the suspension in a process termed froth flotation. This froth can be separated from the bulk solution to effectively concentrate the copper-rich particles. The efficiency of this process is improved by increasing the pH of the ore suspension, calcium oxide (lime) is generally used as a pH modifier. Typically, for every ton of copper ore, 1 kg of CaO is used.

In Chile, copper mining is the dominant heavy industry. Because of the low grade of ore in Chile (0.5% Cu), massive amounts of ore are crushed. Once the copper has been isolated, tailings and water are sent to a setting pond. Over the past few decades companies have produced close to 1,000 tailings ponds containing billions of tons of waste material and large amounts of water. The water at this point has a lowered pH due to acid formation from mining operations, as the liberated sulfides react with air to form acids. In order for operations to remain economically viable this water must be reclaimed and sent back to the mine. To accomplish this lime is generally once again added to the water to raise the pH.

Unfortunately, Chile does not currently have high quality limestone deposits from which lime for this process can be produced. As a result the Chilean copper industry is forced to import lime from other countries at high cost. This year alone Chile will need about 600,000 tons of lime to support these processes.

It should also be appreciated that arsenic is present in significant quantities in many copper ores, and is found in commercial quantities in copper and gold ores found in Chile. In addition to its well known toxicity, inorganic arsenic is also classified as a known human carcinogen. Unfortunately, arsenic contamination of groundwater has resulted in extensive arsenic poisoning in some regions. Arsenic contamination in drinking water has also been associated with increased cancer rates. While arsenic can be removed from drinking water once contamination occurs, such processing is complex and unlikely to be implemented in developing economies.

Thus, there is still a need for inexpensive and practical compositions and methods for treatment of waste water from copper mining operations to both adjust pH and reduce arsenic content.

SUMMARY OF THE INVENTION

The inventive subject matter provides compositions and methods in which an industrial waste product (e.g. steel slag) is utilized to increase the pH of highly acidic water found in mine tailings, such as those produced by copper mining. Surprisingly, this increase in pH is accompanied by a decrease in arsenic content.

One embodiment of the inventive concept is a method of simultaneously increasing pH and reducing arsenic content of copper mine tailing water by providing an alkali metal or alkaline earth-containing industrial waste (e.g. slag from steel production, slag from iron production, fly ash, municipal waste ash, carbide lime, lime fines, and/or cement kiln dust), then contacting copper mine tailing water with a quantity of the alkali metal or alkaline earth-containing industrial waste that is sufficient to increase the pH of the mine tailing water by at least 1 pH unit while reducing arsenic content by at least 10%. In some embodiments the alkali metal or alkaline earth-containing industrial waste is actively mixed with the copper mine tailing water. In other embodiments the industrial waste is contained within a reactor or similar container, and copper mine tailing water is passed through it. In some embodiments the alkali metal or alkaline earth-depleted industrial waste is recovered following treatment of the copper mine tailing water. This depleted industrial waste can in turn be used as a raw material for the recovery of one or more metals.

Another embodiment of the inventive concept is composition that results from treating of copper mine tailing water with an alkali metal or alkaline earth containing industrial waste (e.g. slag from steel production, slag from iron production, fly ash, municipal waste ash, carbide lime, lime fines, and/or cement kiln dust) as described above. Such a composition includes a slurry with an aqueous phase and a solid phase. The solid phase includes a depleted industrial waste with an alkali metal or alkaline earth content that is reduced relative to the alkali metal or alkaline earth containing industrial waste applied during treatment of the copper mine tailing water. The aqueous phase has a pH that is at least 1 pH unit higher than that of the copper mine tailing water and an arsenic content that is at least 10% lower than that of the copper mine tailing water. In some embodiment the alkaline earth content of the alkali metal or alkaline earth containing industrial waste includes calcium.

Another embodiment of the inventive concept is a method of reducing expansion of an industrial waste by providing or obtaining an alkali metal or alkaline earth-containing industrial waste (e.g. slag from steel production, slag from iron production, fly ash, municipal waste ash, carbide lime, lime fines, and/or cement kiln dust), then contacting the alkali metal or alkaline earth-containing industrial waste with a quantity of mine tailing water to generate an alkali metal or alkaline earth-depleted industrial waste. The quantity of mine tailing water used is sufficient to reduce carbonate content of the alkali metal or alkaline earth-containing industrial waste by at least 10%. In some embodiments the alkali metal or alkaline earth-containing industrial waste is actively mixed with the mine tailing water. In some embodiments an alkali metal or alkaline earth-depleted industrial waste is recovered following contact with the mine tailing water. In some embodiments an additional step of recovering a metal from the alkali metal or alkaline earth-depleted industrial waste is included.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 provides a schematic depiction of an exemplary method of the inventive concept.

FIG. 2 shows typical results of the studies of the effect purified calcium carbonate (PCC) and of different steel slag materials on pH of copper mine tailing water.

DETAILED DESCRIPTION

Figure 1:
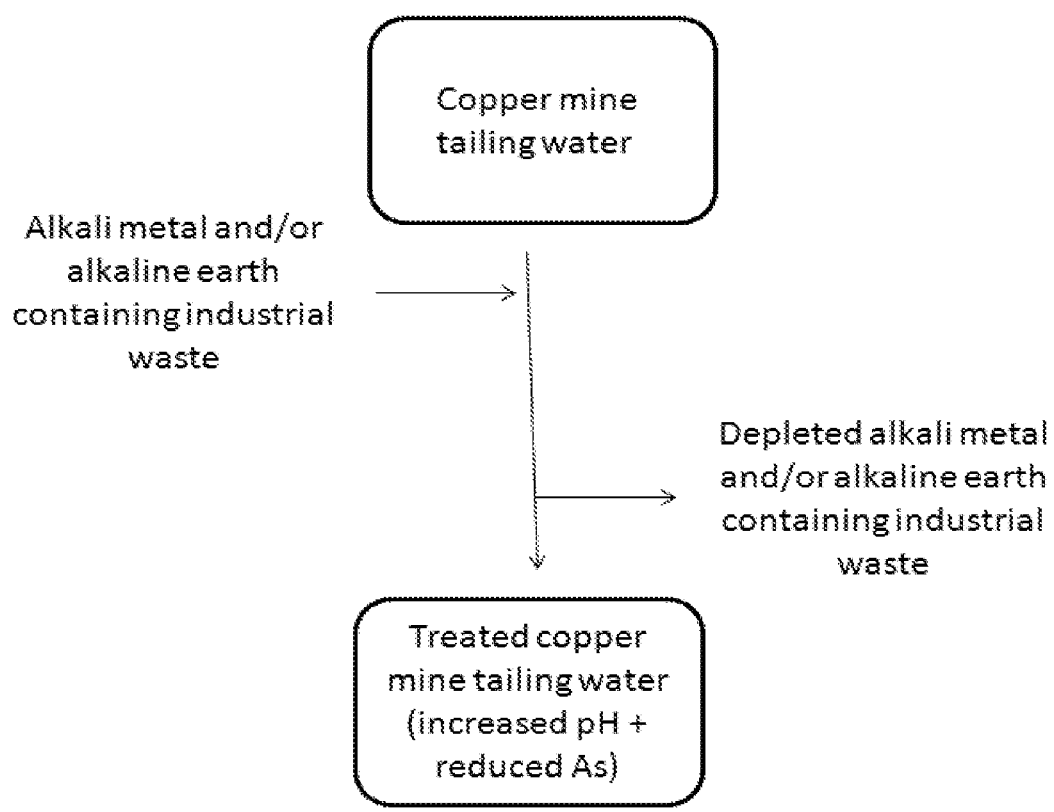
FIG. 1.

The following description includes information that may be useful in understanding the present invention. It is not an admission that any of the information provided herein is prior art or relevant to the presently claimed invention, or that any publication specifically or implicitly referenced is prior art.

The inventive subject matter provides compositions and methods in which an alkali metal or alkaline earth-containing industrial waste materials are used to treat waste water from copper mining operations. Such treated waste water is suitable for recycling and reuse in copper mining operations. Suitable alkali metal or alkaline earth-containing industrial waste materials include fly ash and slag from steel manufacturing operations. Surprisingly, the Applicants have found that use of such materials in quantities sufficient to raise pH are also effective in reducing arsenic content of the resulting treated water.

One should appreciate that the disclosed techniques provide many advantageous technical effects, including effective utilization of industrial waste products and reduction in water consumption by copper mining operations.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Applicants have found that slag produced in steel production and other alkali metal and alkaline earth-containing industrial wastes can be utilized in place of high quality lime and/or similar materials in raising the pH of waste water found in copper mine tailings. The composition of steel slags can vary depending on the nature of the iron ore and processes used for steel production. Typical compositions of slags generated as waste byproducts of steel and iron production are shown in Table 1.

TABLE 1

| Component | Blast furnace slag | Converter slag | Electric arc furnace slag | | Andesite (reference) | Conventional cement |
| --- | --- | --- | --- | --- | --- | --- |
| | | | Oxidizing slag | Reducing slag | | |
| CaO | 41.7% | 45.6% | 22.8% | 55.1% | 5.8% | 64.2% |
| $SiO_2$ | 33.8% | 11.0% | 12.1% | 18.8% | 59.6% | 22.0% |
| T-Fe | 0.4% | 17.4% | 29.5% | 0.3% | 3.1% | 3.0% |
| MgO | 7.4% | 6.5% | 4.8% | 7.3% | 2.8% | 1.5% |
| $Si_2O_3$ | 13.4% | 1.9% | 6.8% | 16.5% | 17.3% | 5.5% |
| S | 0.8% | 0.06% | 0.2% | 0.4% | — | 2.0% |
| $P_2O_5$ | <0.1% | 1.7% | 0.3% | 0.1% | — | — |
| MnO | 0.3% | 5.3% | 7.9% | 1.0% | 0.2% | — |

It should be appreciated that, in addition to calcium (in the form of calcium oxide or CaO), such slags can include significant residual iron (Fe) content. Suitable slags and/or industrial wastes can have significant alkali metal (e.g. sodium, potassium, etc.) and/or or alkaline earth (e.g. magnesium, calcium, etc.) content. Such alkali metal and/or alkaline earth content can be in the form of salts (such as fluorides, chlorides, and/or carbonates) and/or oxides.

Suitable industrial wastes that are useful as replacements for lime in the treatment of copper mine tailings include slags from steel production, slags from iron production, fly ash from coal, municipal waste ash, carbide lime, lime fines, cement kiln dust, and/or municipal ash waste. In some embodiments two or more waste materials can be used in combination.

The amount of steel slag or other industrial waste that is effective in raising the pH of copper mine tailing water can vary, depending on the nature and/or composition of the steel slag and the source of the copper mine tailing water. Amounts of steel slag effective for treating copper mine tailing water can range from about 0.01% (w/v) to about 10% (w/v). Steel slag can be provided as a powder and/or particulate that can be added directly to the copper mine tailing water or added as a slurry. The particle size of the steel slag in such powders or slurries can range from about 10 μm to about 1 mm or more in mean diameter. Such particulates are typically spherical or approximately spherical, however other configurations are suitable. In such embodiments the particulates of steel slag or other industrial waste can be maintained in suspension (for example by mixing) for a period of time suitable to raise pH of the copper mine tailing water and/or reduce arsenic content to the desired extent. Subsequently the particulates of steel slag or other industrial waste can be collected, for example by settling, decantation, and/or filtration. In some embodiments such spent particulates of steel slag or other industrial waste can be re-used for treatment of additional amounts of copper mine tailing water. In other embodiments such spent particulates of steel slag or other industrial waste can be used as raw materials for the recovery of remaining metals. In still other embodiments such spent particulates of steel slag or other industrial waste can be used in building materials (e.g. concrete).

An exemplary process of the inventive concept is shown schematically in FIG. 1. Copper mine tailing water, which has an acidic pH and can contain high levels of arsenic (As) is contacted and/or mixed with an industrial waste that contains an alkali metal and/or an alkaline earth salt or oxide. Contact with the industrial waste generates a treated copper mine tailing water with an increased pH (e.g. by 1 pH unit or more) and reduced arsenic content (e.g. by at least 10%) relative to the untreated copper mine tailing water. The process also generates a depleted industrial waste, from which some metal salts have been extracted. Such depleted industrial waste can be utilized in other processes, for example as a source of valuable metals (the relative concentration of which has been increased through depletion of other solid materials of the waste) or as a filler in building materials with improved durability (due to depletion of calcium salt and/or oxide content).

As noted above, particles of steel slag can be utilized by formation of a bulk suspension in the copper mine tailing water, maintained in suspension, and collected. In other embodiments particles of steel slag can be provided in a reactor or similar vessel through which copper mine tailing water is passed. In such embodiments the particles of steel slag can be sized to remain on one side of a frit or filter in a wall of the reactor, and/or imbedded in a permeable matrix through which the copper mine tailing water can flow. In such embodiments the steel slag can provided as particles and/or pellets ranging in size from about 0.5 mm to about 5 cm.

In some embodiment a steel slag or similar material can be provided with solid tailing materials from copper mining, followed by application of water to the solids. In some of such embodiments the steel slag or similar material can be provided as a layer underlying a volume of solid copper mine tailing materials, such that water applied to the solid copper mine tailings first passes through the tailings prior to passing through the layer of steel slag or similar materials for pH adjustment and arsenic removal. Alternatively, steel slag or similar materials can be provided as a separate body or field of solids positioned downstream from a copper mine or a volume of tailing materials from a copper mine, such that water passing through the copper mine materials also passes through the steel slag (or similar materials) for pH adjustment and arsenic reduction. In other embodiments the steel slag or similar material can be mixed with solid copper mine tailings, such that water applied to the solid mixture undergoes pH adjustment and arsenic removal. In such embodiments the steel slag or similar material and the solid copper mine tailings can conveniently be arranged as a heap at or near the mining site. In such embodiments the steel slag can provided as particles and/or pellets ranging in size from about 0.5 mm to about 5 cm in mean diameter.

In some embodiments the steel slag particulates can be collected following treatment (for example by settling, centrifugation, and/or filtration) for re-use or additional processing following treatment of copper mine tailing water. Such extracted industrial waste materials are relatively enriched in remaining metals, and as such can be utilized of these remaining metals in subsequent metal recovery processes.

Figure 2:
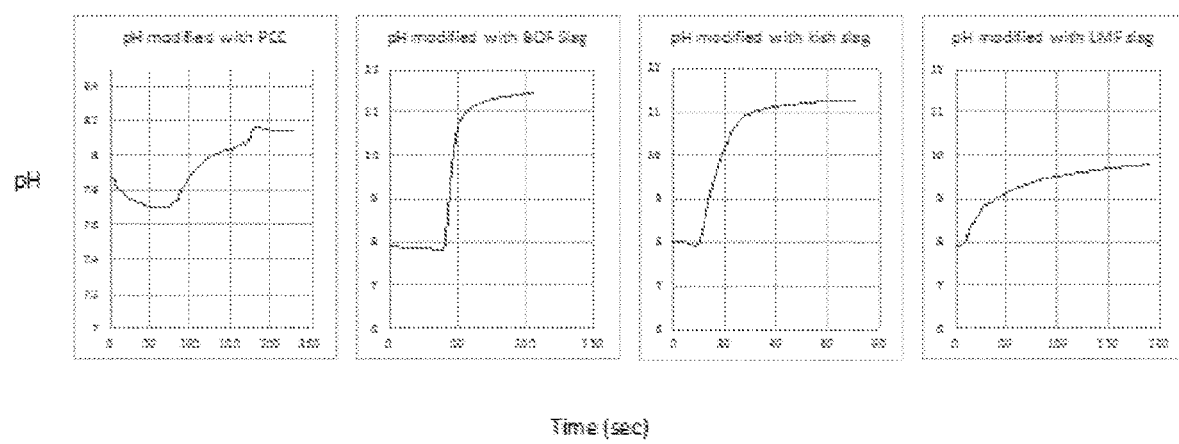
FIG. 2.

Typical results for the use of steel slag in treatment of copper mine tailing water are shown in FIG. 2. In these studies one gram of either pure calcium carbonate (PCC) or a steel slag pH was added to 150 mL of copper tailing water and stirred at 400 rpm while pH was recorded. Pure calcium carbonate would be expected to provide an effect similar to or superior to that of lime. As shown the pH shift provided by an equivalent weight of steel slag is more rapid and of greater magnitude than that produced by PCC, indicating that steel slag can be used in smaller amounts than would be required for treatment of copper tailing water with PCC or lime, despite having a lower calcium carbonate/oxide content.

Surprisingly, Inventors have found that in addition to raising the pH of copper mine tailing water addition of steel slag can simultaneously decrease arsenic content. It should be appreciated that arsenic in such mine tailings represents a severe environmental hazard, and that the costs of remediation of this hazard amount to billions of dollars globally. Arsenic content of copper tailing water can be reduced by about 10%, about 20%, about 30%, about 40%, about 50%, about 60%, about 70% about 80%, about 90%, about 95%, about 99%, or more than about 99% by the addition of steel slag. Without wishing to be bound by theory the Inventors believe that the presence of residual iron (for example, Fe(II)) in the steel slag facilitates removal of arsenic from copper mine tailing water.

In another embodiment of the inventive concept, mine tailing water can be used to stabilize slags and other carbonate-containing wastes. While steel slags and other waste products have been utilized in building materials (for example, as filler) the utility of these is limited by the presence of excessive amounts of carbonate salts, such as calcium carbonate. On exposure to the environment over time such carbonate-rich slag or waste can absorb atmospheric $CO_2$, which in turn results in expansion of the slag or waste material. Such expansion can destabilize roadbeds and/or building materials that incorporate such slag or waste. Inventors contemplate that contacting carbonate rich slag or waste with water from mine tailings can result in a reduction in carbonate content of the slag or waste, thereby reducing or preventing uptake of atmospheric $CO_2$ and reducing or preventing unwanted expansion and the resulting destabilization of building materials. Such exposure can simultaneously increase the pH of the mine tailings and/or decrease their arsenic content. In embodiments of the inventive concept the carbonate content (e.g. calcium carbonate content) of a slag or waste can be reduced by about 10%, 20%, 30%, 40%, 50%, 60%, 70%, 80%, 90%, 95%, 98%, 99%, or more than about 99% following contact with mine tailings and/or water from mine tailings.

It should be appreciated that depletion of carbonate salts from slags or other wastes during treatment of mine tailing water can result in a relative increase in the content of potentially valuable metals and other materials not removed by such treatment. Such spent or depleted carbonate-depleted slags and/or waste materials can be further processed to recover these valuable metals, which can be present in commercially viable concentrations following removal of carbonate salts (such as calcium carbonate).

In some embodiments, steel slag and/or other industrial waste materials can be subjected to processes that remove all or a portion of their calcium prior to use in treatment of mine tailings or water from mine tailings. For example, a steel slag can be treated with a lixiviant compound (such as monoethylamine-hydrochloride) to produce a post-treatment slag with a reduced or eliminated calcium content. Such post-treatment slag can be utilized for pH adjustment of and/or arsenic removal from mine tailings and similar substances as detailed above.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of reducing expansion of a building material, comprising:
    obtaining an alkali metal or alkaline earth-containing industrial waste; and
    contacting the alkali metal or alkaline earth-containing industrial waste with a quantity of mine tailing water to generate an alkali metal or alkaline earth-depleted industrial waste with reduced expansion on environmental exposure relative to the alkali metal or alkaline earth-containing industrial waste; and
    incorporating the alkali metal or alkaline earth-depleted industrial waste into a nascent building material as a filer,
    wherein the quantity of mine tailing water is sufficient to reduce carbonate content of the alkali metal or alkaline earth-containing industrial waste by at least 10%.

2. The method of claim 1, wherein the alkali metal or alkaline earth-containing industrial waste is selected from the group consisting of a slag from steel production, a slag from iron production, a fly ash, a municipal waste ash, carbide lime, lime fines, and cement kiln dust.

3. The method of claim 1, comprising step of mixing the alkali metal or alkaline earth-containing industrial waste with the mine tailing water.

4. The method of claim 1, comprising step of recovering the alkali metal or alkaline earth-depleted industrial waste following contact with the mine tailing water and prior to addition to the nascent building material.

5. The method of claim 4, comprising the additional step of recovering of a metal from the alkali metal or alkaline earth-depleted industrial waste.

6. The method of claim 1, wherein the industrial waste has previously been depleted of calcium content.

7. The method of claim 6, wherein the industrial waste is depleted by treatment with a calcium-extracting lixiviant.

* * * * *

UNITED STATES PATENT AND TRADEMARK OFFICE
CERTIFICATE OF CORRECTION

| | |
|---|---|
| PATENT NO. | : 11,427,487 B2 |
| APPLICATION NO. | : 17/051029 |
| DATED | : August 30, 2022 |
| INVENTOR(S) | : Michael D. Wyrsta |

It is certified that error appears in the above-identified patent and that said Letters Patent is hereby corrected as shown below:

In the Claims

At Column 8, Lines 38 and 39, change, "building material as a filer" to --building material as a filler--

At Column 8, Line 48, change, "The method of claim 1, comprising step" to --The method of claim 1, comprising a step--

At Column 8, Line 51, change, "The method of claim 1, comprising step" to --The method of claim 1, comprising a step--

Signed and Sealed this
Tenth Day of October, 2023

*Katherine Kelly Vidal*

Katherine Kelly Vidal
*Director of the United States Patent and Trademark Office*